Feb. 16, 1926.

C. M. YOUNG 1,572,980

EMERGENCY LINK

Filed June 9, 1923

Inventor
Charles M. Young.
By Louis M. Schmidt
Atty.

Patented Feb. 16, 1926.

1,572,980

UNITED STATES PATENT OFFICE.

CHARLES M. YOUNG, OF NEW BRITAIN, CONNECTICUT.

EMERGENCY LINK.

Application filed June 9, 1923. Serial No. 644,457.

*To all whom it may concern:*

Be it known that I, CHARLES M. YOUNG, a citizen of the United States, residing at New Britain, in the county of Hartford and State of Connecticut, have invented certain new and useful Improvements in Emergency Links, of which the following is a specification.

My invention relates to improvements in emergency links for use in anti-skidding devices for wheels of automobiles, of the form that is used in the tread portion of said devices to replace a link that has become broken and useless on account of wear under conditions of use, and the object of my improvement is to produce an emergency link of simple form, comprising a structure that is formed generally after the manner of other, adjacent links of common form, with a return bend at each end, and which differs therefrom in the detail of having one of the sides that serve usually as a side connecting and closing wall provided with a slot for permitting of quick assembling without the use of any special tools, and, furthermore, which in the assembled position is locked against accidental separation and disconnection by reason of the adaptation of the slot for assembling to fit only the parts of the adjacent links that have been appreciably reduced by wear, and which reduced parts are so located that disassembling involves travel over a circuitous route such as will not be attained under normal conditions of use, said emergency link being adapted to be hardened.

In the accompanying drawing:—

Figure 1:
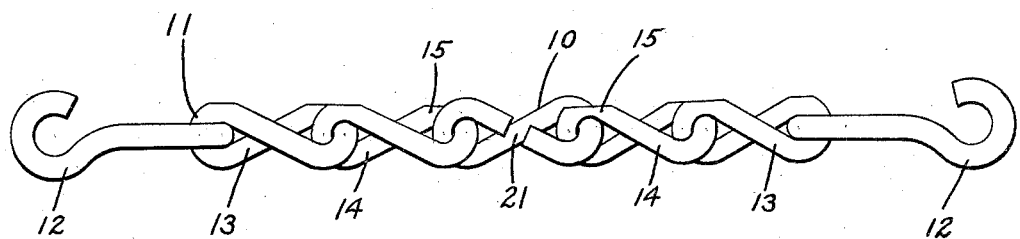
Figure 1 is a side elevation of the tread member of an anti-skidding device that has incorporated therein as the middle link an emergency link that is made in accordance with my improvement.
Figure 2:
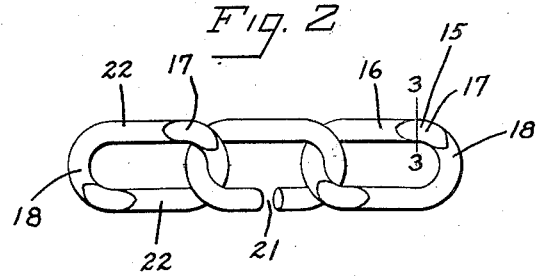
Figure 2 is a plan view of the emergency link and adjacent links.
Figure 3:
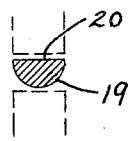
Figure 3 is a sectional view on the line 3—3 of Fig. 2, being through the worn portion of a link, the border walls of the slot being indicated by broken lines.

My improved emergency link 10 is adapted to be incorporated into the structure of a thread member 11 of an anti-skidding device of ordinary form in place of a link that has become worn under conditions of use and has become broken and useless. Such an ordinary tread member 11 comprises a hook 12 at each end, made of wire, and intermediate said hooks 12 there is a series of links consisting of five similar links made of wire, each link having a twist or being of curbed form, as is well known.

The middle link is the one that receives the most severe usage and this is the one that is shown as being replaced by means of my improved link 10.

The other links comprise the end links 13 that are connected to the two hooks 12 and intermediate said end links 13 and the emergency link or middle link 10 there is in each case an intermediate link 14.

The wear on the different links varies in degree with the maximum at the middle, appreciably less at the intermediate links, and the minimum at the end links.

Thus by the time the middle link has become worn and broken, as mentioned, the intermediate links will have become appreciably worn, and the end links to an extent hardly appreciable at all.

Considering the intermediate links 14 and the worn and reduced portions thereof, said reduced portions 15 appear as zones 17 exposing a substantially flat face that merges at the edges with the adjacent periphery 16 which is that of the original wire of circular form of cross-section.

There are two reduced portions 15, one at each end and generally at one side of the return bend 18 that engages with the adjacent link when the tread member is under strain.

The cross-section of the reduced portion 15 is approximately semi-circular, comprising an arc 19 subtended by a chord 20, and which chord 20 approximates a diameter.

The gap or slot 21 in the emergency link 10 is made a good fit for a reduced portion 15 substantially as described.

In the complete links the two return bends or seat portions 18 are connected by means of the two side arms or strands 22 and the reduced portion 15 is located at one of the junctions of the parts mentioned.

The tread member 11 after being repaired in the manner described is adapted for use in the usual manner and after continued use the outer links 13 and 14 will show wear and an emergency link such as described may be used to replace one that becomes useless.

Wherever there is sufficient wear to ruin a particular link the adjacent links will be found to have become sufficiently worn to permit of the use of my improved emergency link.

The emergency link described is a fixed single piece structure, without moving parts, and is adapted to be hardened by any well known or usual process for hardening steel.

I claim as my invention:—

A chain coupling in the tread member of an anti-skidding device comprising a pair of endless links positioned in spaced relation and an emergency link for coupling said endless links and having a gap in one side, said endless links being substantially similar, each thereof being made of wire, and having the outside of one of the bends or corners appreciably reduced in thickness relatively to the adjacent portions of said wire, said emergency link being made of wire of substantially the same size as that of the endless links, and said endless links and emergency link being individually of curbed or twisted form.

CHARLES M. YOUNG.